US009115905B2

(12) United States Patent
Giazzon et al.

(10) Patent No.: US 9,115,905 B2
(45) Date of Patent: Aug. 25, 2015

(54) STEAM-BAKING OVEN

(75) Inventors: Paolo Giazzon, Santa Giustina (IT);
Massimo Tesser, Sedico (IT); Paolo Candiago, Sedico (IT)

(73) Assignee: GIORIK S.P.A., Sedico (IT)

( * ) Notice: Subject to any disclaimer, the term of this patent is extended or adjusted under 35 U.S.C. 154(b) by 129 days.

(21) Appl. No.: 13/239,910

(22) Filed: Sep. 22, 2011

(65) Prior Publication Data
US 2012/0085244 A1 Apr. 12, 2012

(30) Foreign Application Priority Data

Oct. 8, 2010 (IT) .............................. PN2010A0056

(51) Int. Cl.
A47J 39/00 (2006.01)
A21B 1/00 (2006.01)
F24C 15/32 (2006.01)
A21B 3/04 (2006.01)
A47J 27/04 (2006.01)

(52) U.S. Cl.
CPC ................. *F24C 15/327* (2013.01); *A21B 3/04* (2013.01); *A47J 2027/043* (2013.01)

(58) Field of Classification Search
CPC ....... A21B 3/04; A47J 2027/043; A47J 27/04
USPC ............ 99/467, 468, 473, 474, 476; 219/401; 126/369, 369.1
See application file for complete search history.

(56) References Cited

U.S. PATENT DOCUMENTS

| 5,680,810 | A | * | 10/1997 | Sham .............................. 99/330 |
| 5,694,835 | A | | 12/1997 | Mangina |
| 2004/0261632 | A1 | * | 12/2004 | Hansen et al. .................. 99/468 |
| 2006/0207440 | A1 | * | 9/2006 | Matsuo et al. .................. 99/467 |
| 2008/0105138 | A1 | * | 5/2008 | Segato ............................ 99/447 |
| 2010/0224083 | A1 | * | 9/2010 | Yasuhara ....................... 99/476 |

FOREIGN PATENT DOCUMENTS

| DE | 102004006974 | 9/2004 |
| DE | 102008040398 | 1/2010 |
| EP | 1719414 | 11/2006 |
| EP | 2064954 | 6/2009 |
| WO | 98/52418 | 11/1998 |

* cited by examiner

Primary Examiner — Reginald L Alexander
(74) Attorney, Agent, or Firm — Kristina Castellano; Castellano PLLC

(57) ABSTRACT

A steam-baking oven includes a baking chamber, an element for heating the air in the baking chamber, and a steam generator connected to a water supply controlled by shut-off means. The steam generator has a pipe for spraying water onto the heating means; its operation is controlled according to the humidity in the baking chamber according to a first parameter PX1 and a second parameter PX2. The parameters are preset so as to maintain the steam quality substantially constant with respect to a predefined value. The oven further includes a control interface operatively connected to control means and comprising a control device for selectively varying the steam quality with respect to the predefined value through the variation of the second parameter PX2, which controls the actuation of the shut-off means and corresponds to the duration of water inflow from the water supply toward the steam generator.

6 Claims, 4 Drawing Sheets tx = value of temperature for activation of spraying phase

STEAM-BAKING OVEN

TECHNICAL FIELD OF INVENTION

The present invention refers to a steam-baking oven with automatic control of the steam quality in the baking chamber and the possibility of varying the quality itself with respect to the preset and controlled value. The oven according to the present invention is designed in particular, but not exclusively, for use in the professional catering field.

BACKGROUND OF INVENTION

As is well known, steam baking is increasingly appreciated for the quality of the results; for example, it makes it possible to keep many types of food, such as meat, tender, even when they are cooked at high temperatures and in ventilated ovens, that is with forced air circulation.

Steam is generated in these ovens in various ways.

In a first case, the oven is equipped with a specially provided boiler, which is arranged outside the baking chamber. When the water is brought to a boil in the boiler, the steam is conveyed to the baking chamber of the oven. Steam production is constant, but this solution has the drawback of being more complex and cumbersome due to the overall dimensions of the equipment and the necessity of having specially provided connections.

In a second case, steam is generated directly in the baking chamber by spraying water on the heating elements. In this case, the heating elements cool down when the water hits them, and the quality of the steam is affected. To eliminate this problem, the injection of water is normally timed in such a way as to allow the heating elements to resume their steady state temperature. In any case, the quality of the steam generated in this manner is not constant.

Italian Patent application IT PN2009A000057, filed on Oct. 13, 2009 by the same applicant, describes a combined process for the production of steam in a steam-baking oven. The oven is associated with a steam generator and is connected to a water supply. In the initial starting phase, the steam generator is activated until a substantially saturated steam is obtained in the baking chamber; once saturation is achieved, the steam generator is switched off and the steam is generated by water sprayed directly onto the heating elements. The oven includes means for detecting the percentage of humidity in the baking chamber in order to activate suitable control means that periodically switch on the steam generator so as to maintain the steam quality in the chamber substantially constant with respect to a predetermined value. The steam quality is the percentage by mass of steam in a liquid-steam mixture, which may vary between 0 (saturated liquid) and 1 (dry saturated steam), and thus defines the degree of humidity of the steam present in the baking chamber.

With the automatic control of steam quality according to the above-mentioned procedure, the steam present in the baking chamber is perceived by the user as "dry steam". In this manner, the food is cooked uniformly, without the formation of droplets of water vapor on its surface, which would give the consumer the impression of a "wet" food, or food impregnated with water during the cooking process.

This type of "dry steam", and thus a steam quality of approximately 1 automatically controlled and stabilized, is particularly suitable to cook certain types of vegetables, as for example cauliflower or spinach; once cooked and removed from the oven, the food, although steam baked, does not appear "wet", and the pan is dry because the liquid mass consists of particles in suspension that do not settle down, by the effect of gravity, onto the food or on the bottom of the pan.

However, to cook other types of food it is preferable to have an atmosphere in the baking chamber with a higher percentage of water, and therefore a steam quality lower than 1; this type of cooking is required, for example, in the preparation of potatoes, in which an atmosphere with a higher water content makes it possible to have a faster cooking and the finished product is more suitable for the subsequent processes, in particular for the preparation of mashed potatoes.

SUMMARY OF INVENTION

The main objective of the present invention is therefore to offer a steam-baking oven provided with automatic control of steam quality that makes it possible to vary the hydration of the steam in the baking chamber according to the specific food to be cooked.

In the scope of the task outlined above, one purpose of the present invention is to enable the user to vary the steam quality with respect to the preset and automatically controlled dry steam quality.

Another purpose is to make it possible to cook every type of food in the best possible manner and with the most suitable cooking modes, also allowing the user to personalize the cooking cycle, it being possible to alternate phases of automatic control of the steam quality with phases in which the degree of hydration of the steam is set by the user.

One not least important purpose is to devise a steam-baking oven that achieves the objective and the above-mentioned purposes at extremely competitive costs and is attainable with the usual and well-known systems, machinery and equipment.

The above objective, purposes and advantages, as well as others that will be more evident in the following description, are achieved with a steam-baking oven as described below.

BRIEF DESCRIPTION OF THE DRAWINGS

Further characteristics of the invention will be better illustrated in the description of a particular, but not exclusive, embodiment shown by way of non-limiting example in the enclosed drawings, wherein.

DETAILED DESCRIPTION OF THE INVENTION

Figure 1:
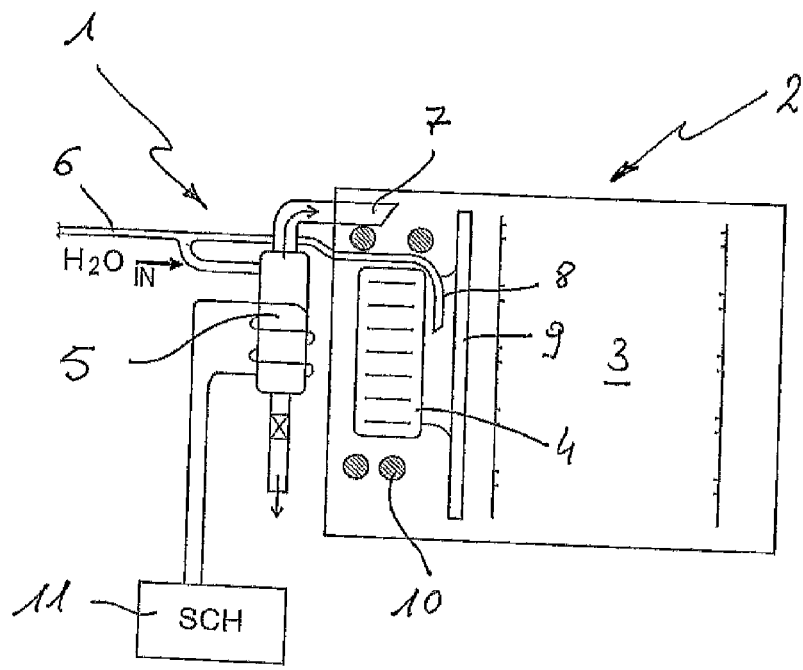
FIG. 1 schematically illustrates a front elevational view of a baking oven equipped with a steam generation system and automatic control of the steam quality.
Figure 2:
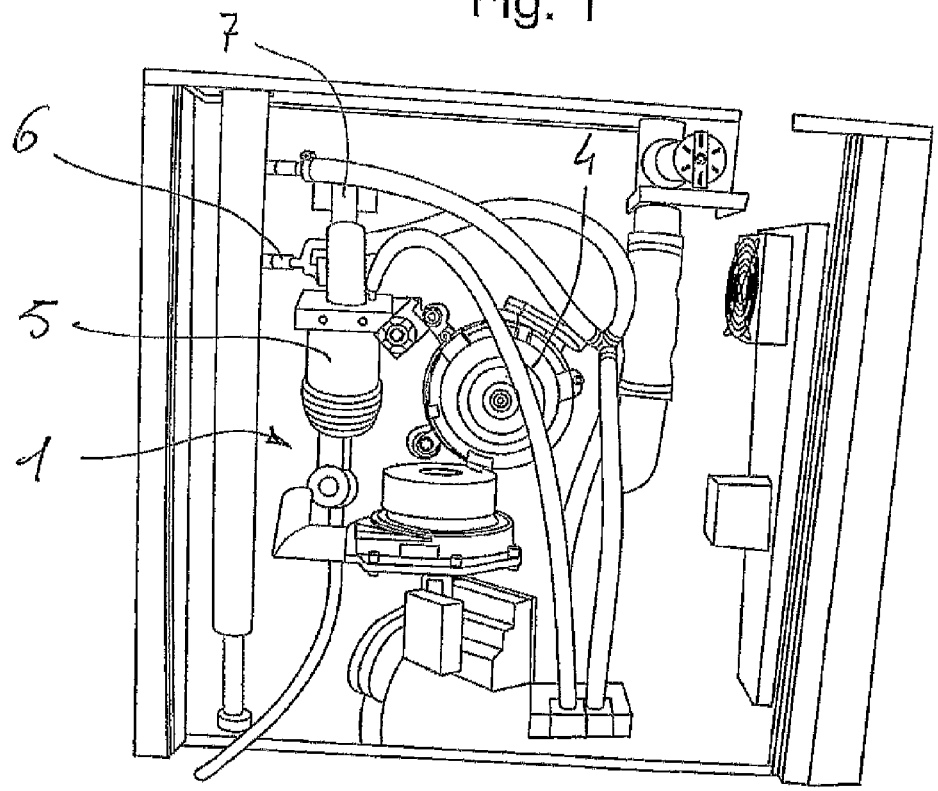
FIG. 2 is a schematic illustration of the system of FIG. 1 in a view lateral to the door of the oven.
Figure 4:
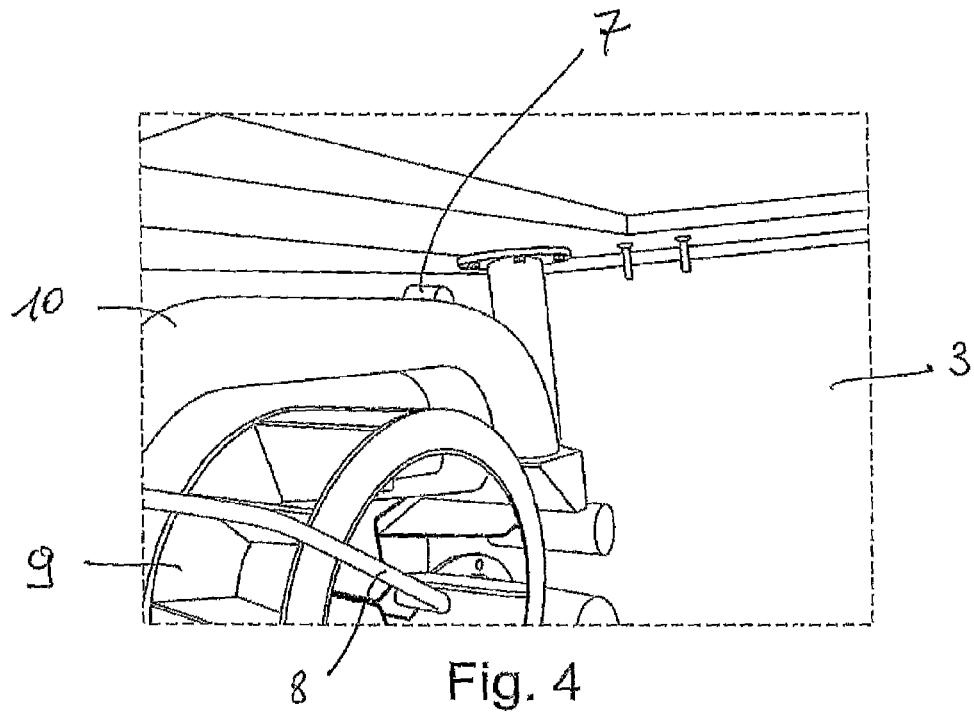
FIG. 4 is a detail of FIG. 3.
Figure 3:
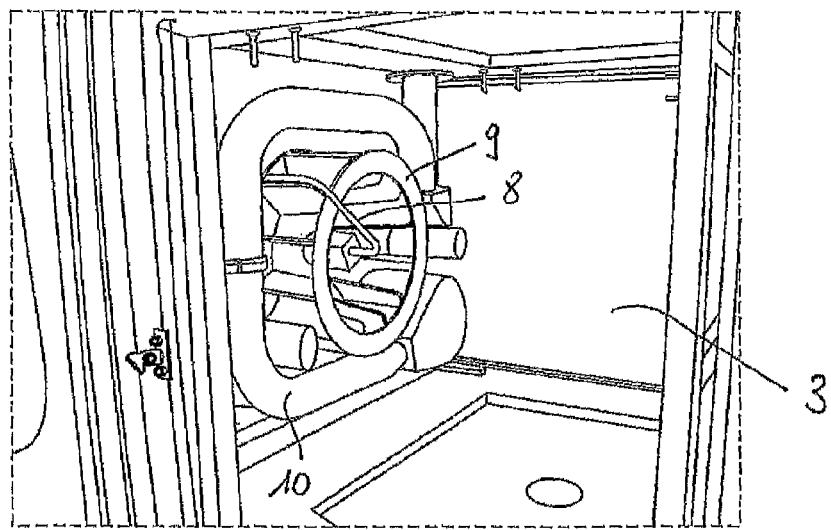
FIG. 3 shows the inside of the chamber in the oven of the previous figures.

With reference to the previously mentioned figures, number 1 refers to a steam generation device associated with a baking oven 2.

The oven 2 includes a baking chamber 3 containing at least one air heating element, consisting for example of a heat exchanger 10 or of one or more electrical heating elements of known type involving one or more walls of the baking chamber 3, and at least one fan 4 stirring the air inside the baking chamber 3 and arranged adjacent to the heating element.

The steam generation device 1 associated with the oven 2 includes a steam generator 5 connected to a water supply 6 and provided with a steam outflow duct 7 communicating with the baking chamber 3.

A water injection pipe 8, also connected to the water supply 6, is arranged inside the baking chamber 3 to spray water against the wall of the chamber itself 3 provided with the heating elements, preferably where the fan 4 is positioned.

Inside the baking chamber 3 is also provided a deflector 9 arranged in front of and approximately coaxial to the fan 4 to distribute and convey substantially uniformly the warm air and/or the steam in the chamber 3.

Similarly, if the heating element consists of the heat exchanger 10, the latter surrounds at least partially the deflector 9 in order to distribute the heat uniformly inside the chamber 3.

Figure 5:
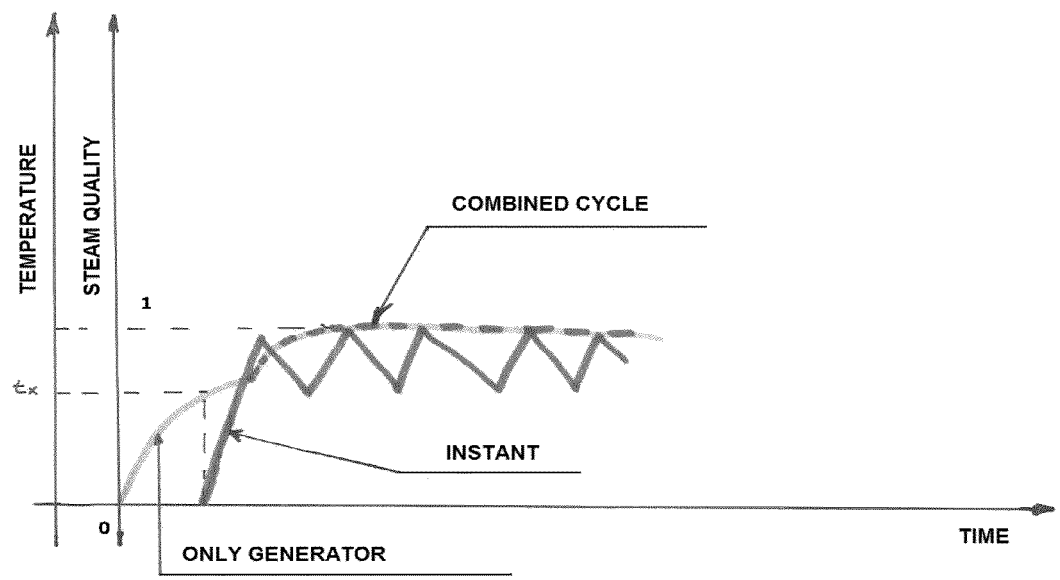
FIG. 5 is a diagram illustrating a time-based steam production in an oven that implements the automatic steam quality control procedure.
Figure 7:
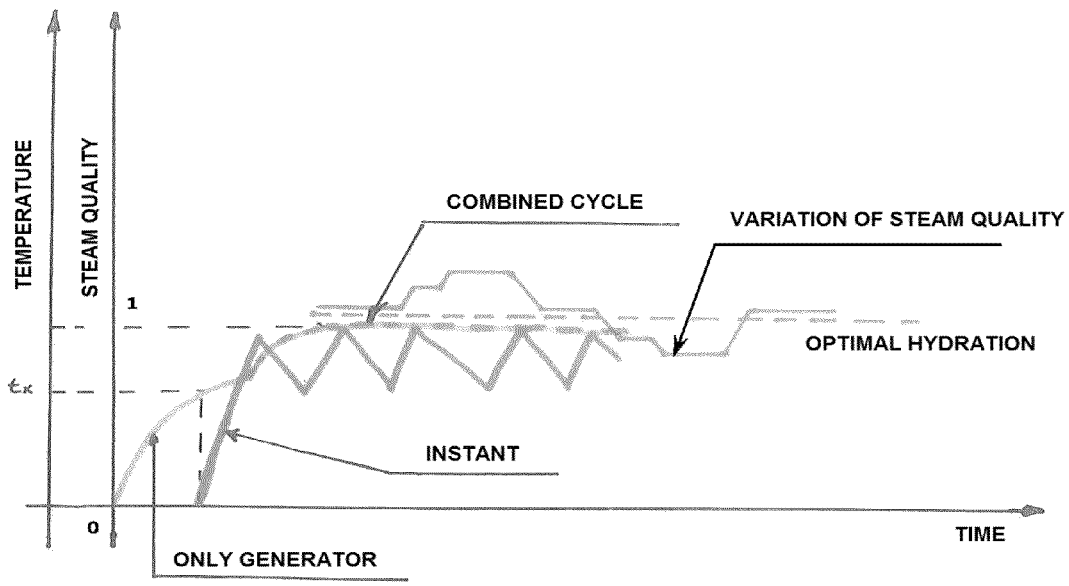
FIG. 7 is a diagram similar to the one of FIG. 5, showing the variation of the steam quality during the cooking cycle.
Figure 6:
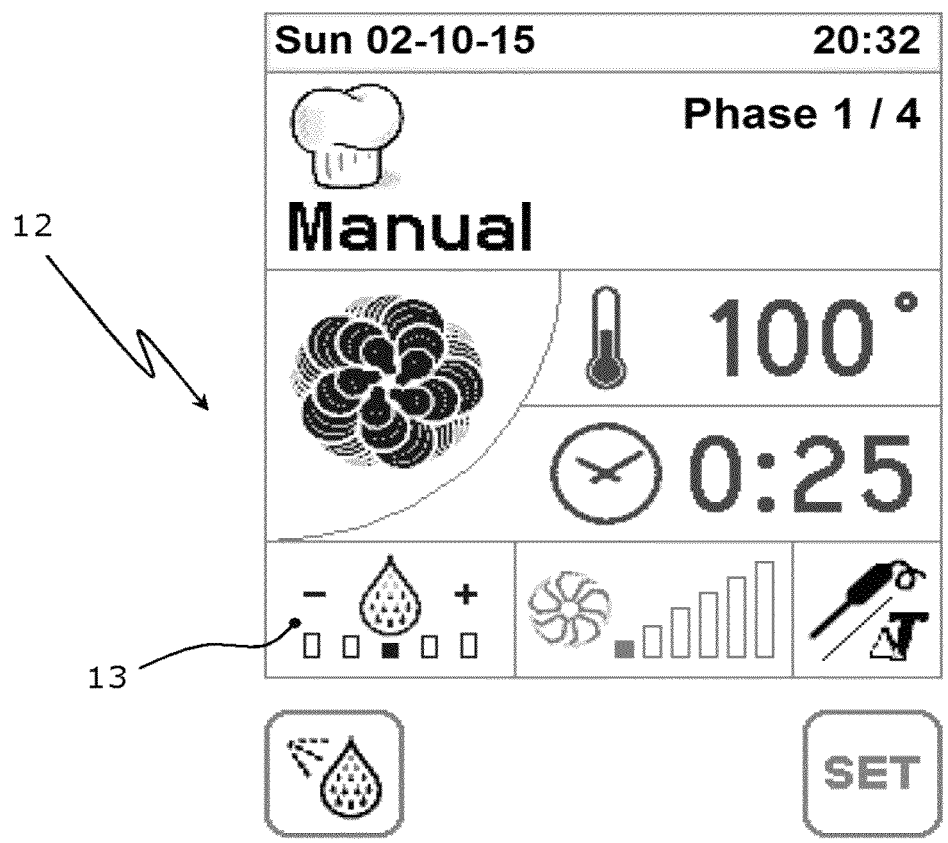
FIG. 6 illustrates a control interface for the manual variation of the steam quality in the oven of the previous figures.

Control means 11, such as a printed circuit board, controlled by suitable means for detecting the moisture percentage in the baking chamber 3, control the activation and deactivation of the steam generator 5 to carry out the combined steam production process with automatic control of the steam quality as disclosed in patent application IT PN2009A000057, which is included integrally herein for reference. The process has the purpose of keeping the steam quality substantially constant, as exemplified in the diagram of FIG. 5, and thus to determine that during the cooking cycle said value is preferably maintained around 1, so that the steam generated in the combined process is substantially dry saturated steam.

The oven 2 according to the present invention is also equipped with means to vary the hydration of the steam, and therefore the steam quality, during the cooking cycle with respect to the preset value automatically controlled by the system described above.

Such means include a control interface 12 operatively connected to the control means 11, such as the printed circuit board that controls the operating parameters of the system and applies the necessary corrective measures in case of deviation from the preset values. The interface 12 includes a control device 13 to control the variation of the steam quality according to the food to be cooked and/or to the specific requirements of the user.

In the automatically controlled steam-baking cycle, the printed circuit board controls, through an algorithm based on an experimentally determined table, the water inflow into the steam generator 5 and into the spray pipe 8 by activating suitable shut-off means, such as solenoid valves (not shown in the drawings), that control the respective supply circuits feeding the generator 5 and the pipe 8 at timed intervals controlled by the PX1 (cycle duration) and PX2 (water feeding duration) parameters. These parameters PX1 and PX2 are fixed and optimized to maintain the steam quality substantially constant in order to carry out a cooking cycle with substantially dry saturated steam, so as to give the user the perception of food cooked with "dry" steam.

The action of the user on the control device 13 enables the interaction with the control printed circuit board and thus to vary electronically and intuitively the parameter PX2 relative to the control of the water feeding solenoid valves.

In this manner, the user can vary the steam quality in the baking chamber 3, obtaining a production of more or less moist saturated steam by varying its hydration through the "+" or "−" push buttons, respectively, on the control device 13, which determine an increased or decreased hydration. By increasing the steam hydration, and thus decreasing the steam quality, the user has the perception of a food cooked with a "moister" steam by the effect of water droplets forming on the food and on the pan due to the fall of water particles in suspension.

The variation selected by the user launches a new algorithm that proportionately modifies the PX2 value as follows, providing the essential condition is satisfied whereby (PX1−PX2)>0:

a. with a first pressure on the "+" button, the PX2 parameter is multiplied by a factor of K1, and with a second pressure by a factor of K2; the maximum incremental limit remains subject to the condition of (PX1−PX2)>0;

b. with a first pressure on the "−" button, the PX2 parameter is divided by a factor of K1, and with a subsequent pressure by a factor of K2; in this case, the (PX1−PX2)>0 condition is always satisfied;

c. if (PX1−PX2)=0, the variation function cannot be activated.

The K1 and K2 factors are values determined experimentally and variable according to the type of oven, and in any case they must meet the following conditions:

$1 < K1 < 2$;
$1 < K2 < 2$, and
$K1 < K2$.

The variation in the degree of steam hydration can be selected manually by the user through the control device 13 during the cooking cycle or it may be called up at the start of a cycle from a memory in which various combined cooking cycle modes with dry saturated steam and moist saturated steam were previously stored.

From what set down above, it is therefore evident how the present invention achieves the initially foreseen purposes and advantages: in effect, the invention proposes a steam-baking oven provided with both an automatic control of the steam quality and with an adjusting system that allows, before or during cooking, the variation of the degree of hydration of the steam in the baking chamber according to the specific food to be cooked.

In particular, the oven according to the present invention allows the user to vary the steam quality with respect to the substantially dry saturated steam quality preset and automatically controlled by the moisture control system.

The oven according to the present invention also makes it possible to optimally cook in the most suitable cooking modes all types of food, also enabling the user to tailor the cooking cycle by allowing the alternation of phases of automatic steam control with phases in which the degree of steam hydration is set by the user, or to select cooking cycles with steam quality settings previously memorized on the basis of the food to be cooked.

Naturally, the present invention is designed to allow numerous applications, modifications or variations without thereby departing from the scope of patent protection as defined by the claims below.

Moreover, the materials and equipment used to realize the present invention, as well as the shapes and dimensions of the individual components, may be the most suitable for the specific requirements.

We claim:
1. A steam-baking oven comprising
a baking chamber,
heating means for heating the air in said baking chamber,
means for the combined production of steam in said baking chamber, comprising a steam generator and a pipe for spraying water on said heating means, control means controlled by sensing means detecting the percentage of humidity inside said baking chamber, said control means being operatively connected to said means for the combined production of steam and adapted to cause, at timed intervals during a baking cycle of an item placed in the baking chamber, a water injection through said pipe for spraying water on said heating means each interval being defined by a first parameter PX1 corresponding to duration of each interval, said interval being the duration of time between subsequent water injections and a second parameter PX2 corresponding to duration of time of the water injection during each interval preset to maintain the steam quality substantially constant with respect to a predefined value, and further comprising a control interface operatively connected to said control means and comprising a control device configured to permit a user to selectively vary the steam quality with respect to said predefined value through the variation of said second parameter PX2.

2. The oven as in claim 1, wherein the variation of said second parameter PX2 is allowed, provided that the following condition is satisfied: PX1−PX2>0.

3. The oven as in claim 1, wherein said second parameter PX2 varies on the basis of a first factor K1 comprised between 1 and 2 at a first actuation of said control device.

4. The oven as in claim 3, wherein said second parameter varies on the basis of a second factor K2 at a subsequent actuation of said control device, wherein K2 is between 1 and 2 and K2>K1.

5. The oven as in claim 1, wherein said selective variation of the steam quality through the actuation of said control device can be carried out manually by the user during the baking cycle.

6. The oven as in claim 1, wherein said selective variation of the steam quality through the activation of said control device can be selected at the start of the baking cycle from a plurality of previously memorized settings.

* * * * *